United States Patent
Osone et al.

(10) Patent No.: US 12,470,968 B2
(45) Date of Patent: Nov. 11, 2025

(54) MOBILE TERMINAL TEST APPARATUS AND POSITION CORRECTION METHOD OF MOBILE TERMINAL

(71) Applicant: ANRITSU CORPORATION, Kanagawa (JP)

(72) Inventors: Dan Osone, Kanagawa (JP); Ryota Chinbe, Kanagawa (JP); Ryuso Kasai, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 384 days.

(21) Appl. No.: 18/187,054

(22) Filed: Mar. 21, 2023

(65) Prior Publication Data

US 2023/0308922 A1    Sep. 28, 2023

(30) Foreign Application Priority Data

Mar. 28, 2022    (JP) ................. 2022-051465

(51) Int. Cl.
| | |
|---|---|
| *H04W 24/10* | (2009.01) |
| *H04W 24/04* | (2009.01) |
| *H04W 64/00* | (2009.01) |

(52) U.S. Cl.
CPC .......... *H04W 24/10* (2013.01); *H04W 24/04* (2013.01); *H04W 64/003* (2013.01)

(58) Field of Classification Search
CPC .... H04W 24/04; H04W 24/10; H04W 64/003
See application file for complete search history.

(56) References Cited

U.S. PATENT DOCUMENTS

| | | | | |
|---|---|---|---|---|
| 2005/0163343 | A1* | 7/2005 | Kakinami | G06V 20/586 382/103 |
| 2008/0025715 | A1* | 1/2008 | Ishii | H04N 23/673 396/128 |
| 2011/0267440 | A1* | 11/2011 | Kim | H04N 5/60 348/E5.026 |
| 2015/0269723 | A1* | 9/2015 | Karam | G06V 20/64 348/46 |
| 2019/0037424 | A1* | 1/2019 | Shirasaki | H04L 5/001 |
| 2020/0132800 | A1* | 4/2020 | Kim | H04B 7/0482 |
| 2021/0227399 | A1 | 7/2021 | Furuta et al. | |
| 2021/0376664 | A1* | 12/2021 | Park | H02J 50/60 |
| 2023/0036090 | A1* | 2/2023 | Liu | G01J 5/48 |
| 2024/0215825 | A1* | 7/2024 | Honma | A61B 5/02416 |
| 2025/0044439 | A1* | 2/2025 | Chan | G01S 13/343 |

FOREIGN PATENT DOCUMENTS

WO    2019-225617 A1    11/2019

* cited by examiner

*Primary Examiner* — Syed Ali
(74) *Attorney, Agent, or Firm* — McDonald Hopkins LLC

(57) ABSTRACT

The mobile terminal test apparatus includes a positioner that adjusts a position of UE, a camera that captures an image of a state of the position of the UE controlled by the positioner, and a control unit that sets the position of the positioner with data on a Peak point of a transmission radio wave in a database, and then compares the current image data of the UE obtained by image capturing of the camera and image data of the Peak point of a transmission radio wave in the database, and displays the current image data of the UE obtained by image capturing of the camera and the image data of the Peak point of the transmission radio wave in the database when an error is greater than a predetermined threshold value.

13 Claims, 5 Drawing Sheets

| Peak Search ID | φ | θ | Measurement value | Image data |
|---|---|---|---|---|
|  |  |  |  |  |
|  |  |  |  |  |

FIG. 2

MOBILE TERMINAL TEST APPARATUS AND POSITION CORRECTION METHOD OF MOBILE TERMINAL

TECHNICAL FIELD

The present invention relates to a mobile terminal test apparatus that tests a mobile terminal.

BACKGROUND ART

When a mobile terminal (user equipment: also referred to as "UE" below) such as a mobile phone or a data communication terminal is developed, it is necessary to test whether or not the developed mobile terminal can perform communication normally. Therefore, a test in which a mobile terminal under test is connected to a test device that operates as a pseudo base station that simulates the functions of an actual base station, communication is performed between the test device and the mobile terminal, and the content of the communication is checked is performed.

Among such tests, there is a conformance test of checking whether the mobile terminal complies with the 3GPP (3rd Generation Partnership Project) standards.

In addition, in a mobile communication system, a service of 5G NR (New Radio) which is a 5G (5th Generation) radio scheme has started, and the frequency band used in 5G NR is broadly classified into two frequency ranges of FR1 (Frequency Range 1: 450 to 6,000 MHz) and FR2 (Frequency Range 2: 24,250 to 52,600 MHz).

In a high frequency band such as FR2, a propagation loss increases, and thus beamforming of forming a beam by collecting radio waves in a specific direction is applied in order to compensate for the propagation loss.

In a test case of a conformance test in FR2 of 5G NR (also referred to as "FR2TC" below), before measurement of the test case, it is necessary to statistically ensure that the beam can be correctly directed in the intended direction, from an EIRP (equivalent iso-tropic radiated power) value obtained when a beam direction is operated over the entire spherical surface centered on the mobile terminal.

In addition, it takes an enormous amount of time to search for a Peak point with the maximum EIRP value before measurement of FR2TC. Thus, a Peak point search result for the EIRP value over the entire spherical surface is stored in a database. When FR2TC having the same measurement condition is measured, the Peak point search result having the same measurement condition is read from the database, the position of the mobile terminal is adjusted by a positioner, and the Peak point is directed in the determined direction. In this manner, it is possible to shorten the measurement time.

Patent Document 1 discloses that all directions of a sphere centered on a user device are measured in the user device that responds to transmission to which beamforming is applied.

RELATED ART DOCUMENT

Patent Document

[Patent Document 1] WO2019/225617

DISCLOSURE OF THE INVENTION

Problem that the Invention is to Solve

However, when position information of the mobile terminal is obtained from the past results and the position of the mobile terminal is adjusted, the position may deviate from the obtained position information due to aging deterioration of the positioner or incorrect attachment of the mobile terminal.

In the case of correcting such a deviation, it is difficult to correct the deviation manually with only position information such as an angle. Thus, the work efficiency deteriorates, and the measurement accuracy also decreases.

An object of the present invention is to provide a mobile terminal test apparatus capable of facilitating correction of a position of a mobile terminal, improving work efficiency, and improving measurement accuracy.

Means for Solving the Problem

According to the present invention, a mobile terminal test apparatus performs a conformance test of a mobile terminal. The mobile terminal test apparatus includes a reception antenna that receives a radio wave transmitted from the mobile terminal, a positioner that adjusts a position of the mobile terminal, a camera that captures an image of the mobile terminal, and a control unit that stores at least information on the position of the mobile terminal at a Peak point of a transmission radio wave and image data of the mobile terminal obtained by image capturing of the camera at the Peak point of the transmission radio wave, in a database as Peak point data of the transmission radio wave for each mobile terminal, when the Peak point data of the transmission radio wave of the mobile terminal as a measurement target is stored in the database, compares current image data to the image data of the Peak point data of the transmission radio wave, the current image data being obtained in a manner that the camera captures an image of the mobile terminal of which the position is adjusted by the positioner based on the information on the position of the mobile terminal in the Peak point data of the transmission radio wave, and displays the current image data obtained by image capturing of the camera and the image data of the Peak point data of the transmission radio wave when an error between the position of the mobile terminal in the current image data obtained by the image capturing of the camera and the position of the mobile terminal in the image data of the Peak point data of the transmission radio wave is greater than a predetermined threshold value.

With this configuration, when the error between the position of the mobile terminal in the current image data obtained by image capturing of the camera and the position of the mobile terminal in the image data of the Peak point data of the transmission radio wave is greater than the predetermined threshold value, the current image data obtained by image capturing of the camera and the image data of the Peak point data of the transmission radio wave are displayed. Therefore, it is possible to facilitate correction of the position of the mobile terminal by a user, to improve work efficiency, and to improve measurement accuracy.

Also, in the mobile terminal test apparatus according to the present invention, the control unit acquires the Peak point data of the transmission radio wave while adjusting the positioner, when the Peak point data of the transmission radio wave of the mobile terminal as the measurement target is not stored in the database.

With this configuration, when the Peak point data of the transmission radio wave of the mobile terminal as the measurement target is not stored, the Peak point data of the transmission radio wave is acquired. Therefore, it is possible to use the Peak point data when measurement under the same measurement condition is performed, and to improve work efficiency.

Also, in the mobile terminal test apparatus according to the present invention, the control unit calculates the error based on an overlapping portion of the mobile terminal between the current image data obtained by image capturing of the camera and the image data of the Peak point data.

With this configuration, the error is calculated based on the overlapping portion of the mobile terminal between the current image data obtained by image capturing of the camera and the image data of the Peak point data of the transmission radio wave. Therefore, it is possible to easily calculate the error, to reduce a processing load, and to improve the work efficiency.

Further, according to the present invention, there is provided a position correction method of a mobile terminal in a mobile terminal test apparatus that includes a reception antenna that receives a radio wave transmitted from the mobile terminal, a positioner that adjusts a position of the mobile terminal, and a camera that captures an image of the mobile terminal, and performs a conformance test of the mobile terminal. The position correction method includes a step of storing at least information on the position of the mobile terminal at a Peak point of a transmission radio wave and image data of the mobile terminal obtained by image capturing of the camera at the Peak point of the transmission radio wave, in a database as Peak point data of the transmission radio wave for each mobile terminal, when the Peak point data of the transmission radio wave of the mobile terminal as a measurement target is stored in the database, a step of comparing current image data to the image data of the Peak point data of the transmission radio wave, the current image data being obtained in a manner that the camera captures an image of the mobile terminal of which the position is adjusted by the positioner based on the information on the position of the mobile terminal in the Peak point data of the transmission radio wave, and a step of displaying the current image data obtained by image capturing of the camera and the image data of the Peak point data of the transmission radio wave when an error between the position of the mobile terminal in the current image data obtained by the image capturing of the camera and the position of the mobile terminal in the image data of the Peak point data of the transmission radio wave is greater than a predetermined threshold value.

Also, the position correction method of a mobile terminal according to the present invention further includes a step of acquiring the Peak point data of the transmission radio wave while adjusting the positioner, when the Peak point data of the transmission radio wave of the mobile terminal as the measurement target is not stored in the database.

Also, the position correction method of a mobile terminal according to the present invention further includes a step of calculating the error based on an overlapping portion of the mobile terminal between the current image data obtained by image capturing of the camera and the image data of the Peak point data of the transmission radio wave.

With this configuration, when the error between the position of the mobile terminal in the current image data obtained by image capturing of the camera and the position of the mobile terminal in the image data of the Peak point data of the transmission radio wave is greater than the predetermined threshold value, the current image data obtained by image capturing of the camera and the image data of the Peak point data of the transmission radio wave are displayed. Therefore, it is possible to facilitate correction of the position of the mobile terminal by a user, to improve work efficiency, and to improve measurement accuracy.

Advantage of the Invention

According to the present invention, it is possible to provide a mobile terminal test apparatus capable of facilitating correction of the position of a mobile terminal, improving work efficiency, and improving measurement accuracy.

BRIEF DESCRIPTION OF THE DRAWINGS

FIG. 2 is a diagram illustrating an example of a database of Peak point data of the mobile terminal test apparatus according to the embodiment of the present invention.

BEST MODE FOR CARRYING OUT THE INVENTION

Hereinafter, a mobile terminal test apparatus according to an embodiment of the present invention will be described in detail with reference to the drawings.

Figure 1:
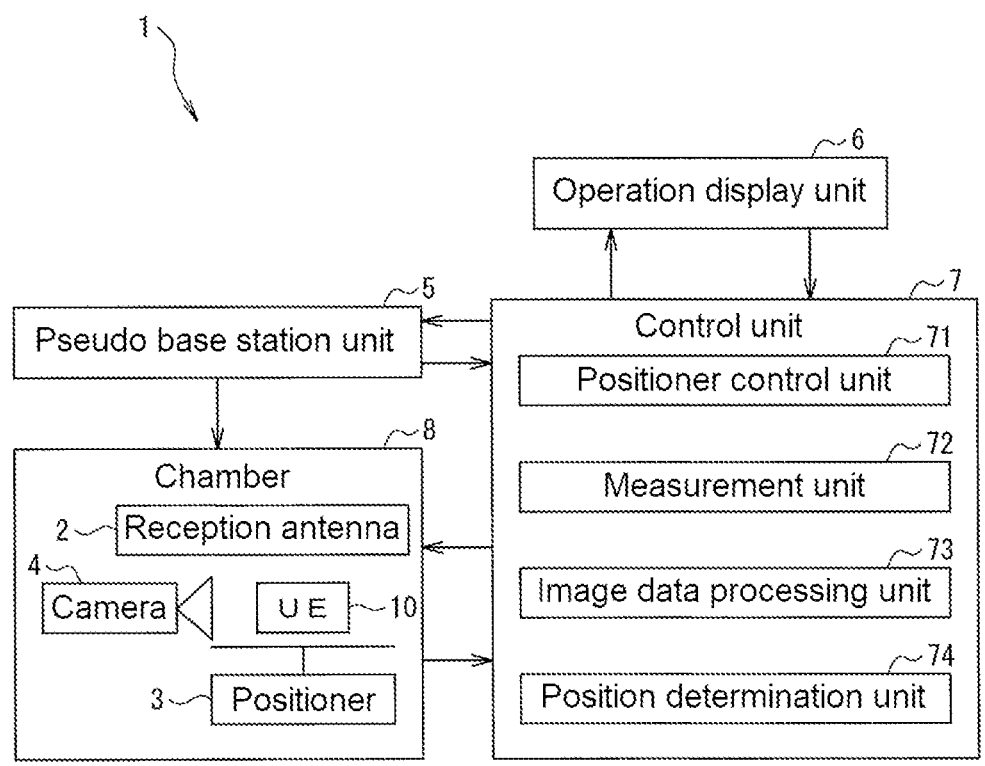
FIG. 1 is a schematic configuration diagram illustrating a mobile terminal test apparatus according to an embodiment of the present invention.

In FIG. 1, a mobile terminal test apparatus 1 according to an embodiment of the present invention is configured to include a reception antenna 2, a positioner 3, a camera 4, a pseudo base station unit 5, an operation display unit 6, and a control unit 7.

The reception antenna 2 receives a radio wave transmitted by UE 10 and outputs the radio wave to the pseudo base station unit 5.

The positioner 3 rotates the UE 10 horizontally and vertically to adjust the position of the UE 10.

The camera 4 captures an image of the state of the position of UE 10 controlled by the positioner 3. The camera 4 is not limited to a camera that captures an image with visible light, and may be a camera that captures an image with infrared rays or X-rays.

The pseudo base station unit 5 transmits and receives a RF (radio frequency) signal to and from the UE 10 under the control of the control unit 7. The pseudo base station unit 5 measures the transmission power, reception power, and the like of the RF signal received from the UE 10 and outputs the measurement result to the control unit 7.

The operation display unit 6 includes an operation unit that receives an operation input from the user, and a display unit that displays a test parameter setting screen, a measurement result of the pseudo base station unit 5, and the like. The operation unit is configured by a touch pad, a keyboard, push buttons, and the like. The display unit is configured by a liquid crystal display device or the like.

In accordance with an instruction input to the operation display unit 6, the control unit 7 causes the operation display unit 6 to display a test scenario creation screen to input information required for generating the test scenario, or to generate the test scenario based on the information input to the operation display unit 6 on the test scenario creation screen. In accordance with an instruction input to the operation display unit 6, the control unit 7 transmits the instruction to the pseudo base station unit 5 to perform a test based on the test scenario stored in a storage device or to display the state or the like during the test on the operation display unit 6 based on information on the state of each layer, the state of communication with the UE 10, and the like, which is transmitted from the pseudo base station unit 5, and the like.

Here, the mobile terminal test apparatus 1 is configured by a computer device (not illustrated) provided with a communication module for communicating with the UE 10. The computer device includes a central processing unit (CPU), a read only memory (ROM), a random access memory (RAM), a storage device such as a hard disk device, an input and output port, and a touch panel (not illustrated).

A program for causing the computer device to function as the mobile terminal test apparatus 1 is stored in the ROM and the hard disk device of the computer device. That is, the computer device functions as the mobile terminal test apparatus 1 by the CPU executing the program stored in the ROM by using the RAM as a work area.

As described above, in the present embodiment, the control unit 7 is configured by the CPU, and the pseudo base station unit 5 is configured by a communication module.

In the present embodiment, the reception antenna 2, the positioner 3, and the camera 4 are installed together with the UE 10 in a chamber 8 that is radio-isolated from the outside, and measurement is performed.

In the present embodiment, the control unit 7 searches for a Peak point with the maximum EIRP value before measurement of FR2TC, and stores the Peak point search result of the EIRP value on the entire spherical surface in the database. Not only EIRP but also EIS (equivalent iso-tropic sensitivity) and RSRPB (reference signal received power per branch) may be measured.

Therefore, the control unit 7 includes a positioner control unit 71, a measurement unit 72, an image data processing unit 73, and a position determination unit 74.

The positioner control unit 71 controls the horizontal and vertical rotation angles of the positioner 3 and controls the position of the UE 10 attached to the positioner 3.

The measurement unit 72 measures the EIRP, the EIS, and the RSRPB of an RF signal received by the reception antenna 2.

The image data processing unit 73 processes the image data obtained by image capturing of the camera 4 to recognize the position of the UE 10, and superimposes two pieces of image data on each other.

The position determination unit 74 determines the position of the UE 10 based on the image data processed by the image data processing unit 73.

For example, the control unit 7 stores a measurement value of the RF signal received by the reception antenna 2 and the image data obtained by image capturing of the camera 4 in a database of a storage device, while changing the vertical rotation angle $\varphi$ of the positioner 3 and the horizontal rotation angle $\theta$ of the positioner 3 by a predetermined step size.

The control unit 7 configures a database as illustrated in FIG. 2, for example. Information for identifying the UE 10 is set in "Peak Search ID", and the vertical rotation angle $\varphi$, the horizontal rotation angle $\theta$, the measurement value, and the image data are stored. Only the data of the Peak point with the maximum measurement value may be stored instead of all pieces of measurement data.

In measurement of FR2TC, when the Peak point data of the UE 10 as a measurement target is stored in the database, the control unit 7 reads the data from the database and sets the position of the UE 10.

For example, the control unit 7 reads the vertical rotation angle $\varphi$ of the positioner 3 and the horizontal rotation angle $\theta$ of the positioner 3 from the database, and controls the positioner 3 such that the vertical rotation angle and the horizontal rotation angle of the positioner 3 reach $\varphi$ and $\theta$.

The control unit 7 sets the position of the positioner 3 from data of the Peak point in the database. Then, the control unit 7 compares the current image data of the UE 10 obtained by image capturing of the camera 4 to the image data of the Peak point in the database. When an error is greater than a predetermined threshold value, the control unit 7 displays the current image data of the UE 10 obtained by image capturing of the camera 4 and the image data of the Peak point in the database, and causes the user to correct the position of the UE 10.

Figure 3:
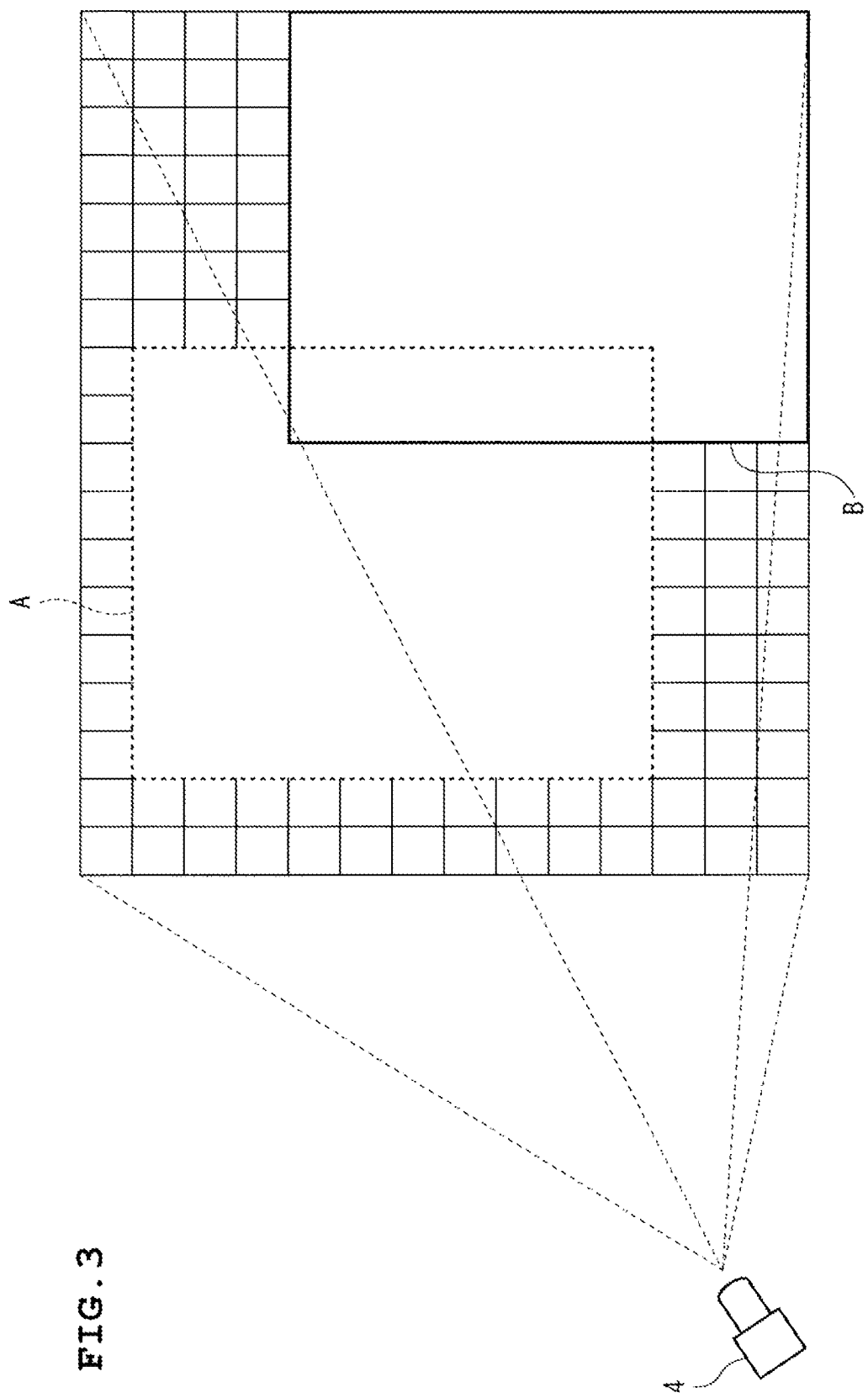
FIG. 3 is a diagram illustrating an example of a state of image data when an error of the mobile terminal test apparatus is large, according to the embodiment of the present invention.

For example, as illustrated in FIG. 3, the control unit 7 superimposes the current image data of the UE 10 obtained by image capturing of the camera 4 and the image data of the Peak point in the database, and sets, as the error, a portion at which the current image of the UE 10 indicated by B does not overlap an image of the UE 10 at the Peak point in the database, which is indicated by A.

For example, when a ratio of an area of the portion at which the current image of the UE 10 and the image of the UE 10 at the Peak point in the database do not overlap each other to the area of the UE 10 is equal to or less than a threshold value, the control unit 7 determines that there is no need for correction and a conformance test can be performed.

Figure 4:
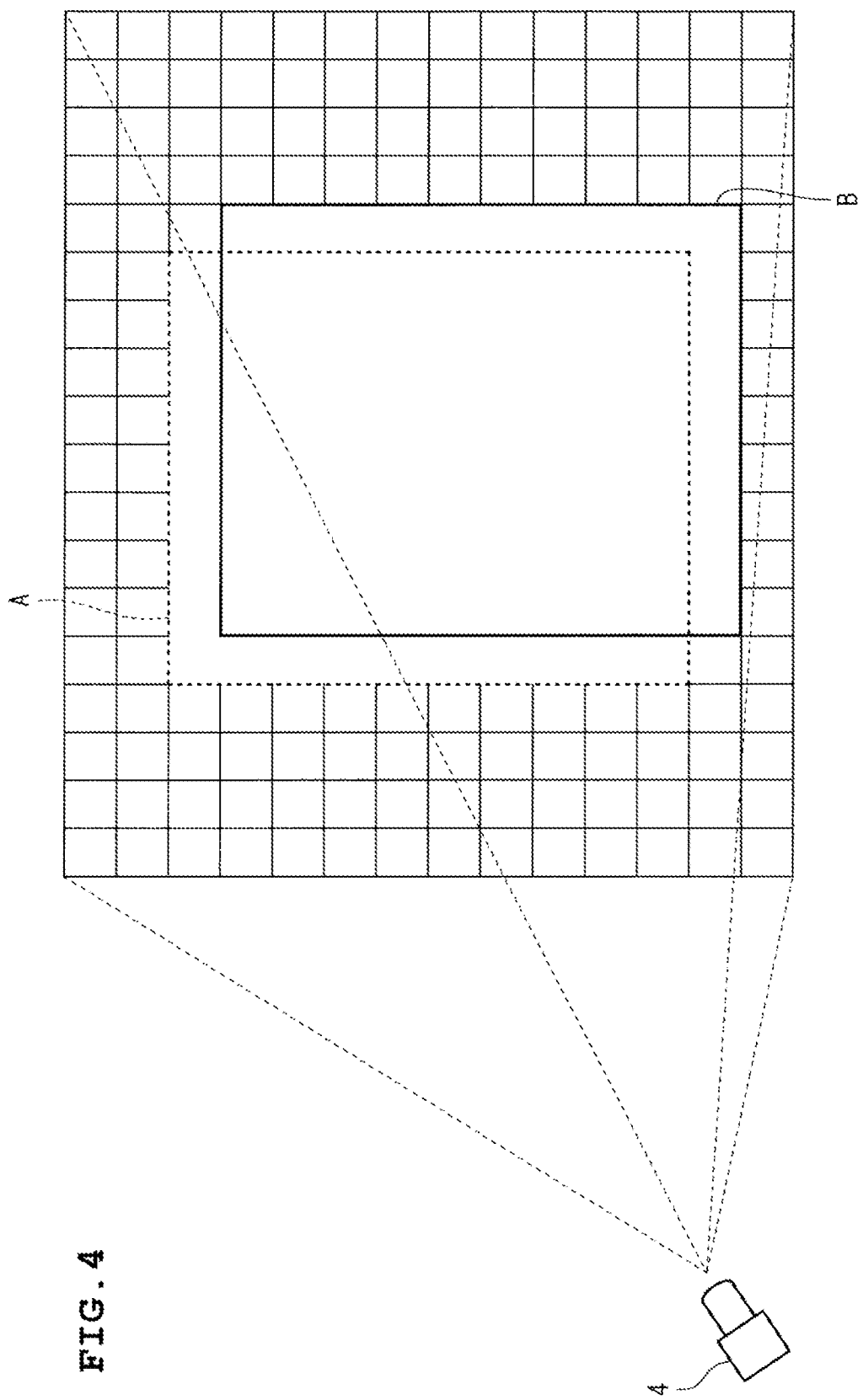
FIG. 4 is a diagram illustrating an example of the state of the image data when the error of the mobile terminal test apparatus is small, according to the embodiment of the present invention.

For example, when a state as illustrated in FIG. 3 is changed to a state as illustrated in FIG. 4 by correction of the user, and the ratio of the area of the portion at which the current image of the UE 10 and the image of the UE 10 at the Peak point in the database do not overlap each other to the area of the UE 10 is equal to or less than the threshold value, the control unit 7 performs conformance test measurement.

Figure 5:
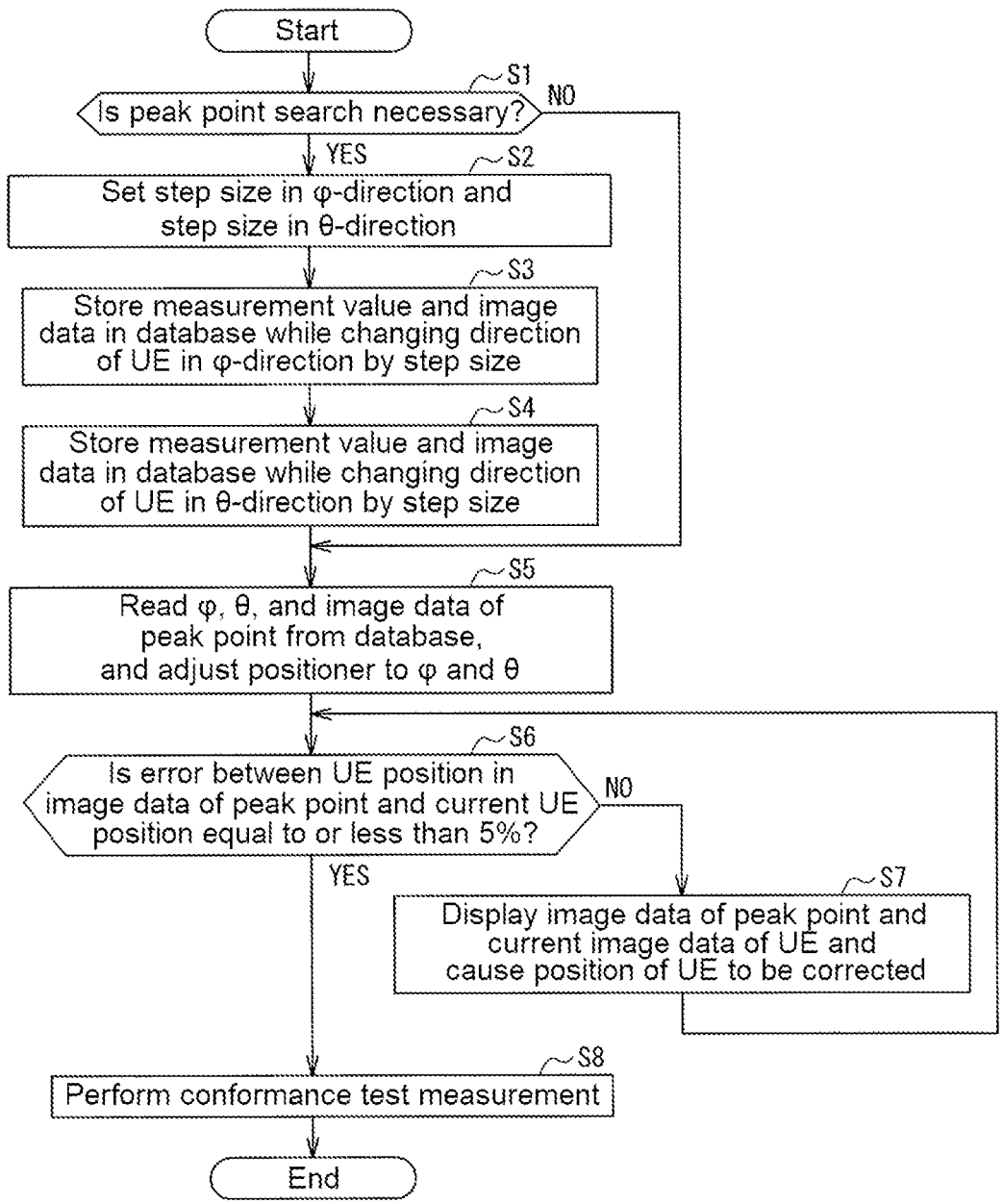
FIG. 5 is a flowchart for explaining a procedure of a conformance test execution process of the mobile terminal test apparatus according to the embodiment of the present invention.

A conformance test execution process by the mobile terminal test apparatus 1 according to the present embodiment configured as described above will be described with reference to FIG. 5. The conformance test execution process described below is executed when execution of the conformance test is selected by operating the operation display unit 6 and a test case of FR2TC is selected.

In Step S1, the control unit 7 determines whether or not a Peak point search is necessary. For example, when the result of the Peak point search of the UE 10 as the test target is registered in the database, the control unit 7 determines that the Peak point search is unnecessary.

When determining that the Peak point search is necessary, the control unit 7 executes the process of Step S2. When determining that the Peak point search is unnecessary, the control unit 7 executes the process of Step S5.

In Step S2, the control unit 7 causes the user to set the step size in a $\varphi$-direction and the step size in a $\theta$-direction. After executing the process of Step S2, the control unit 7 executes the process of Step S3.

In Step S3, the control unit 7 stores the measurement value and the image data in the database while changing the direction of the UE 10 in the φ-direction by the step size. After executing the process of Step S3, the control unit 7 executes the process of Step S4.

In Step S4, the control unit 7 stores the measurement value and the image data in the database while changing the direction of the UE 10 in the θ-direction by the step size. After executing the process of Step S4, the control unit 7 executes the process of Step S5.

In Step S5, the control unit 7 reads φ, θ, and image data of the Peak point from the database, and adjusts the positioner 3 to φ and θ. After executing the process of Step S5, the control unit 7 executes the process of Step S6.

In Step S6, the control unit 7 determines whether the error between the position of the UE 10 in the image data of the Peak point and the current position of the UE 10 is equal to or less than 5%.

When determining that the error is equal to or less than 5%, the control unit 7 executes the process of Step S8. When determining that the error is not equal to or less than 5%, the control unit 7 executes the process of Step S7.

In Step S7, the control unit 7 displays the image data of the Peak point and the current image data of the UE 10 and causes the user to correct the position of the UE 10. After executing the process of Step S7, the control unit 7 executes the process of Step S6.

In Step S8, the control unit 7 performs conformance test measurement. After executing the process of Step S8, the control unit 7 ends the conformance test execution process.

Thus, in the above-described embodiment, the control unit 7 sets the position of the positioner 3 from data of the Peak point in the database. Then, the control unit 7 compares the image data of the current UE 10 obtained by image capturing of the camera 4 to the image data of the Peak point in the database. When an error is greater than a predetermined threshold value, the control unit 7 displays the image data of the current UE 10 obtained by image capturing of the camera 4 and the image data of the Peak point in the database.

As a result, the current image data of the UE 10 obtained by image capturing of the camera 4 and the image data of the Peak point in the database are displayed. Therefore, it is possible to facilitate correction of the position of the UE 10 by the user, to improve work efficiency, and to improve measurement accuracy.

When there is no Peak point data of the UE 10 as the measurement target, the control unit 7 searches for the Peak point with the maximum EIRP value, and stores the Peak point search result of the EIRP value over the entire spherical surface in the database.

Thus, when there is no Peak point data of the UE 10 as the measurement target, the Peak point is searched. Peak point data of the UE 10 as the measurement target can be collected and can be used when FR2TC is measured under the same measurement condition, and the work efficiency can be improved.

In addition, the control unit 7 superimposes a portion for the UE 10 in the current image data of the UE 10 obtained by image capturing of the camera 4 and a portion for the UE 10 in the image data of the Peak point in the database. The control unit 7 sets, as the error, a portion at which the current image of the UE 10 and the image of the UE 10 at the Peak point in the database do not overlap each other.

As a result, it is possible to easily calculate the error, to reduce a processing load, and to improve the work efficiency.

In the present embodiment, the case of one camera 4 has been described, but the error in the position of the UE 10 may be obtained from image data obtained by image capturing of a plurality of cameras.

Hitherto, the embodiment of the present invention has been disclosed, but it is clear that changes can be made by those skilled in the art without departing from the scope of the present invention. All such modifications and equivalents are intended to be included in the claims as follows.

DESCRIPTION OF REFERENCE NUMERALS AND SIGNS

1: Mobile Terminal Test Apparatus
2: Reception Antenna
3: Positioner
4: Camera
7: Control Unit
10: UE (Mobile Terminal)
71: Positioner Control Unit
72: Measurement Unit
73: Image Data Processing Unit
74: Position Determination Unit

What is claimed is:

1. A mobile terminal test apparatus that performs a conformance test of a mobile terminal, the apparatus comprising:
a reception antenna that receives a radio wave transmitted from the mobile terminal;
a positioner that adjusts a position of the mobile terminal;
a camera that captures an image of the mobile terminal; and
a control unit that
stores at least information on the position of the mobile terminal at a Peak point of a transmission radio wave and image data of the mobile terminal obtained by image capturing of the camera at the Peak point of the transmission radio wave, in a database as Peak point data of the transmission radio wave for each mobile terminal,
when the Peak point data of the transmission radio wave of the mobile terminal as a measurement target is stored in the database,
compares current image data to the image data of the Peak point data of the transmission radio wave, the current image data being obtained in a manner that the camera captures an image of the mobile terminal of which the position is adjusted by the positioner based on the information on the position of the mobile terminal in the Peak point data of the transmission radio wave, and
displays the current image data obtained by image capturing of the camera and the image data of the Peak point data of the transmission radio wave when an error between the position of the mobile terminal in the current image data obtained by image capturing of the camera and the position of the mobile terminal in the image data of the Peak point data of the transmission radio wave is greater than a predetermined threshold value,
wherein the control unit is configured to change the vertical rotation angle of the positioner and the horizontal rotation angle of the positioner by a predetermined step size.

2. The mobile terminal test apparatus according to claim 1, wherein the control unit acquires the Peak point data of the transmission radio wave while adjusting the positioner, when the Peak point data of the transmission radio wave of the mobile terminal as the measurement target is not stored in the database.

3. The mobile terminal test apparatus according to claim 1, wherein the control unit calculates the error based on an overlapping portion of the mobile terminal between the current image data obtained by image capturing of the camera and the image data of the Peak point data of the transmission radio wave.

4. The mobile terminal test apparatus according to claim 1, wherein the position of the mobile terminal is a physical position.

5. The mobile terminal test apparatus according to claim 1, wherein the positioner is configured to rotate the mobile terminal horizontally and vertically.

6. The mobile terminal test apparatus according to claim 1, wherein the reception antenna, the mobile terminal, the positioner, and the camera are disposed within a chamber.

7. The mobile terminal test apparatus according to claim 1, wherein the control unit is configured to determine the physical position of the mobile terminal based on the current image data.

8. A position correction method of a mobile terminal in a mobile terminal test apparatus that includes a reception antenna that receives a radio wave transmitted from the mobile terminal, a positioner that adjusts a position of the mobile terminal, and a camera that captures an image of the mobile terminal, and performs a conformance test of the mobile terminal, the method comprising:
- a step of changing the vertical rotation angle of the positioner and the horizontal rotation angle of the positioner by a predetermined step size;
- a step of storing at least information on the position of the mobile terminal at a Peak point of a transmission radio wave and image data of the mobile terminal obtained by image capturing of the camera at the Peak point of the transmission radio wave, in a database as Peak point data of the transmission radio wave for each mobile terminal;
- when the Peak point data of the transmission radio wave of the mobile terminal as a measurement target is stored in the database,
- a step of comparing current image data to the image data of the Peak point data of the transmission radio wave, the current image data being obtained in a manner that the camera captures an image of the mobile terminal of which the position is adjusted by the positioner based on the information on the position of the mobile terminal in the Peak point data of the transmission radio wave; and
- a step of displaying the current image data obtained by image capturing of the camera and the image data of the Peak point data of the transmission radio wave when an error between the position of the mobile terminal in the current image data obtained by image capturing of the camera and the position of the mobile terminal in the image data of the Peak point data of the transmission radio wave is greater than a predetermined threshold value.

9. The position correction method of a mobile terminal according to claim 8, further comprising:
- a step of acquiring the Peak point data of the transmission radio wave while adjusting the positioner, when the Peak point data of the transmission radio wave of the mobile terminal as the measurement target is not stored in the database.

10. The position correction method of a mobile terminal according to claim 8, further comprising:
- a step of calculating the error based on an overlapping portion of the mobile terminal between the current image data obtained by image capturing of the camera and the image data of the Peak point data of the transmission radio wave.

11. The position correction method of a mobile terminal according to claim 8, wherein the position of the mobile terminal is a physical position.

12. The position correction method of a mobile terminal according to claim 8, wherein the positioner is configured to rotate the mobile terminal horizontally and vertically.

13. The position correction method of a mobile terminal according to claim 8, further comprising:
- a step of determining the physical position of the mobile terminal based on the vertical rotation angle, the horizontal rotational angle, and the current image data.

* * * * *